(12) United States Patent
Burnette et al.

(10) Patent No.: US 11,665,071 B2
(45) Date of Patent: *May 30, 2023

(54) COORDINATED DATA SHARING IN VIRTUALIZED NETWORKING ENVIRONMENTS

(71) Applicant: Opanga Networks, Inc., Bellevue, WA (US)

(72) Inventors: John Burnette, Seattle, WA (US); Sean Brown, Tacoma, WA (US); Ben Hadorn, Shoreline, WA (US); Hugo Garza, Seattle, WA (US); Ethan Nordness, Seattle, WA (US); Dave Gibbons, Seattle, WA (US); Tayler Angevine, Seattle, WA (US)

(73) Assignee: Opanga Networks, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,500

(22) Filed: Oct. 20, 2021

(65) Prior Publication Data

US 2022/0045920 A1 Feb. 10, 2022

Related U.S. Application Data

(63) Continuation of application No. 16/363,749, filed on Mar. 25, 2019, now Pat. No. 11,159,398.
(Continued)

(51) Int. Cl.
*H04L 12/26* (2006.01)
*H04W 24/10* (2009.01)
(Continued)

(52) U.S. Cl.
CPC ............ *H04L 43/04* (2013.01); *H04W 24/10* (2013.01); *H04W 84/042* (2013.01)

(58) Field of Classification Search
CPC ..... H04L 43/04; H04L 43/026; H04L 43/028; H04W 24/10; H04W 76/00; H04W 76/28
See application file for complete search history.

(56) References Cited

U.S. PATENT DOCUMENTS 9,247,018 B2 * 1/2016 Li .................... H04L 61/5076
9,743,436 B1 * 8/2017 Bradish ................ H04W 48/17
(Continued)

OTHER PUBLICATIONS

Search Report and Written Opinion dated Jul. 2, 2019 for PCT Application No. PCT/US2019/023750.
(Continued)

*Primary Examiner* — Romani Ohri

(57) ABSTRACT

A Metrics Parser Coordinator (MPC) coordinates data sharing between components of a network. A process performed by the MPC may include receiving data from a plurality of input interfaces, parsing the data, filtering the parsed data, storing the filtered data in a metric storage, mapping the filtered data according to the input interfaces, and providing the filtered data stored in the metric storage to the first registered application. Each interface may be defined differently from each other interface, and the filtered data including information requested by a first registered application. The interfaces may include $3^{rd}$ Generation Partnership Project interfaces, Long Term Evolution interfaces, and custom interfaces. The MPC may further allow applications to register to publish data, subscribe to data, or both.

10 Claims, 12 Drawing Sheets

Related U.S. Application Data

(60) Provisional application No. 62/647,343, filed on Mar. 23, 2018.

(51) Int. Cl.
   *H04L 43/04*      (2022.01)
   *H04W 84/04*     (2009.01)

(56) References Cited

U.S. PATENT DOCUMENTS

| | | |
|---|---|---|
| 2006/0095562 A1 | 5/2006 | Agarwal et al. |
| 2009/0201911 A1* | 8/2009 | DuPertuis ............. H04L 65/104 |
| | | 370/352 |
| 2010/0180020 A1 | 7/2010 | Dinger et al. |
| 2012/0039312 A1* | 2/2012 | Narkar .................... H04L 69/22 |
| | | 370/352 |
| 2014/0019609 A1* | 1/2014 | Williams ................ H04L 43/18 |
| | | 709/224 |
| 2016/0277530 A1* | 9/2016 | Jung ....................... H04W 4/70 |

OTHER PUBLICATIONS

Extended European Search Report for Application No. EP 19770345.7, dated Nov. 12, 2021.

D. Trihinas et al., "JCatascopia: Monitoring Elastically Adaptive Applications in the Cloud", 2014 14th IEEE/ACM International Symposium on Cluster, Cloud And Grid Computing, IEEE, May 26, 2014.

WG/TG Chairman, "IFA027—discussion document regarding metric handling—issues and ideas", ETSI Draft; NFVIFIA(18)000010R4, WG NFV IFA Interfaces and Architecture, XP014306262, Jan. 2018.

* cited by examiner

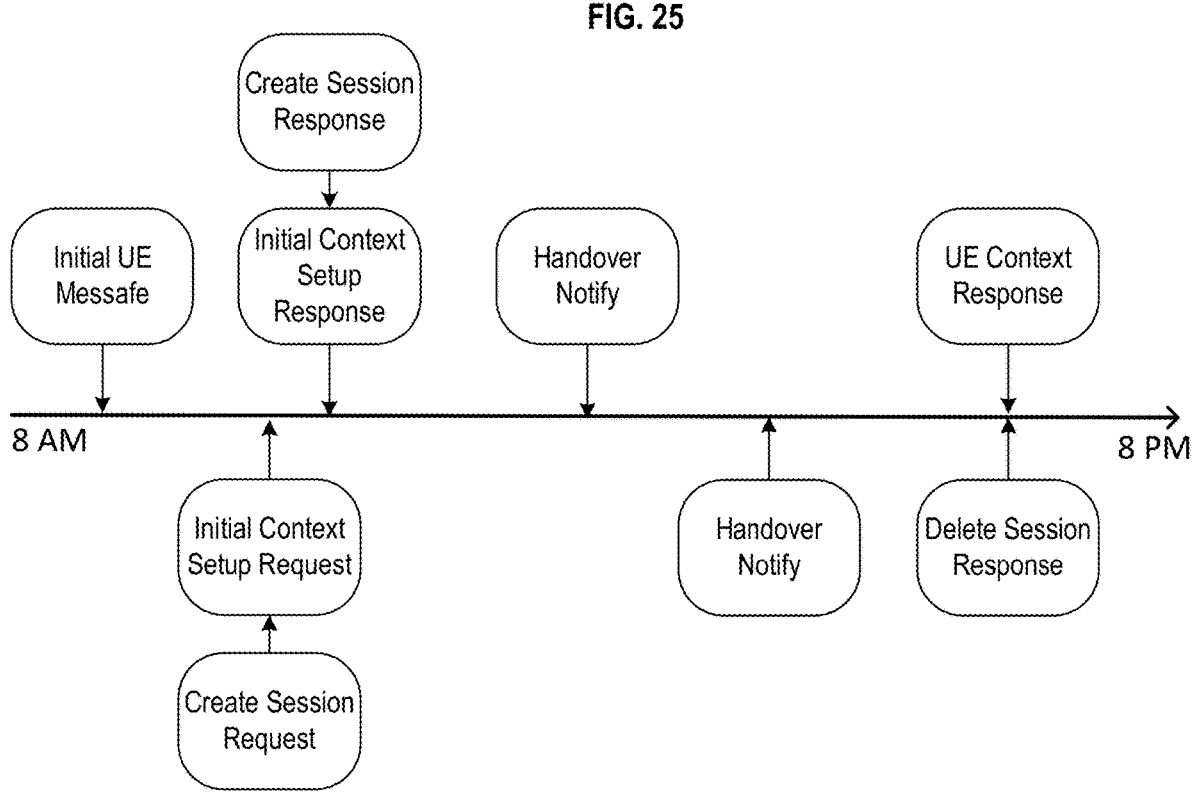

COORDINATED DATA SHARING IN VIRTUALIZED NETWORKING ENVIRONMENTS

CROSS REFERENCE TO RELATED APPLICATIONS

This application is a Continuation of U.S. patent application Ser. No. 16/363,749, filed Mar. 25, 2019, to be issued as U.S. Pat. No. 11,159,398 on Oct. 26, 2021, which claims the benefit of U.S. Provisional Patent Application No. 62/647,343, filed on Mar. 23, 2018, which is incorporated by reference herein for all purposes.

BACKGROUND

Mobile networks are comprised of a variety of components which are responsible for a variety of functions such as sending/receiving user traffic to mobile devices over a wireless interface, delivering that traffic to/from the internet, controlling mobile devices as they move throughout the network, and many others.

Mobile networks may be implemented using Virtualized Network Functions (VNF). VNF is a form of software-defined networking in which functions such as a Software Gateway (SGW) are not implemented using custom hardware, but instead are implemented using, for example, software running on a standard server under a hypervisor. VNF facilitates the development of new network functions.

VNF components may send and receive information over standard interfaces. Each interface may be defined differently so as to have different formats, features, or both. Some interfaces are for passing user data (e.g. S1-U and SGi), some are for network control signaling (e.g. S1-MME and S11) and some are for both (e.g. S5). The interfaces may be 3GPP or Long Term Evolution (LTE) interfaces. For example:

- S1-MME may be used as an interface for control application protocols between an Evolved Universal Mobile Telecommunications System (UMTS) Terrestrial Radio Access Network (E-UTRAN) and a Mobile Management Entity (MME),
- S1-U may be used for S1 user plane data for each bearer between the E-UTRAN and a serving gateway and may enable the serving gateway to anchor inter-eNodeB handover.
- S5 may be used to provides user plane tunneling and tunnel management function between the serving gateway and a Public Data Network (PDN) gateway, may enable serving gateway to connect to multiple PDN gateways for providing different Internet Protocol (IP) services to User Equipment (UE), and may be used for serving gateway relocation associated with UE mobility.
- S11 is a control plane interface that may be used between an MME and a serving gateway for Evolved Packet System (EPS) management.
- SGi may be used between a PDN gateway and an intranet or internet.

Some of these components follow standard specifications (e.g. from the 3rd Generation Partnership Project (3GPP) standards body). Examples of these would be the mobile Serving Gateway (SGW), Packet Gateway (PGW), Mobile Mobility Entity (MME), among others. These components make up part of what is knowns as the Evolved Packet Core (EPC). These components can be implemented on custom hardware or they can be implemented in a virtualized environment as virtual network functions (VNFs).

There can also exist many other non-standard applications in the mobile network that would operate on the same data interfaces, such as a Traffic Manager or an Analytics Collector These non-standard applications and devices could exist on any or multiple of the interfaces identified.

In addition, equipment makers that build these components also export data such as performance metrics in proprietary formats.

Due to the large number of interfaces and the variety and large amount of data that the interfaces carry, it may be difficult for non-standard applications to collect and filter this information into a useable form. For example, a Traffic Manager may need to collect information from both the S1-U and S1-MME, but only requires a subset of the information communicated using those interfaces. Additionally, a Traffic Manager may need to send its own proprietary data to other non-standard applications. There also may be more than one of each component (e.g. multiple Traffic Managers, Analytics collectors, etc.)

Therefore it would be advantageous to have a system that aggregates multiple interfaces into a repository of data that is accessible and useable by both standard and non-standard network applications, allows the information at any point within the end-to-end transport network to be collectively shared amongst both standard and non-standard devices and applications, and does not require applications to shift through massive amounts of data that are irrelevant to them.

BRIEF SUMMARY OF THE DISCLOSURE

An objective of the disclosed embodiments is to facilitate the sharing of information at any point within a network amongst both standard and non-standard devices and applications, and to do so without requiring applications to shift through massive amounts of data that are irrelevant to them.

According to various embodiments of the present disclosure, a method performed by a Metrics Parser Coordinator (MPC) comprises receiving data from a plurality of input interfaces, parsing the data, filtering the parsed data, storing the filtered data in a metric storage, mapping the filtered data according to the input interfaces, and providing the filtered data stored in the metric storage to a first registered application. Each interface is defined differently from each other interface. The filtered data includes information requested by the first registered application.

In an embodiment, the plurality of input interfaces include two or more different interfaces selected from a group comprising $3^{rd}$ Generation Partnership Project (3GPP) interfaces, Long Term Evolution (LTE) interfaces, and custom interfaces.

In an embodiment, the first registered application is a traffic manager.

In an embodiment, the method further comprises registering a second application, wherein registering the second application includes registering the second application as publishing a first type of data, registering the second application as subscribing to a second type of data, or both.

In an embodiment, the method further comprises providing a parser interface, wherein registering the second application is performed using the parser interface.

In an embodiment, when the first application is registered as subscribing to the filtered data, the filtered data is provided to the first registered application in response to receiving the data.

In an embodiment, receiving the data includes receiving the data from the second application only if the second application is registered to publish the type of data associated with the data.

In an embodiment, storing the filtered data in the metric storage is performed only if an application is registered as subscribing to the filtered data.

In an embodiment, filtering the data includes corroborating the parsed data received over a first interface of the plurality of input interfaces with first other parsed data received over the first interface, linking the corroborated parsed data with second other parsed data received over the first interface, and linking the parsed data with third other parsed data received over a second interface of the plurality of input interfaces different than the first interface.

In an embodiment, parsing the data includes parsing the data according to the input interface the data was received through.

According to various embodiments of the present disclosure, a system comprises a processor, a first memory storing filtered data, and a second memory storing program commands. The program commands, when executed by the processor, cause the processor to receive data from a plurality of input interfaces, parse the received data to generate parsed data, generate the filtered data by filtering the parsed data, cause the first memory to store the filtered data in the memory, map the filtered data according to the input interfaces, and provide the filtered data stored in the first memory to an application. The filtered data includes information requested by a registered application.

In an embodiment, the plurality of input interfaces include two or more different interfaces selected from a group comprising 3rd Generation Partnership Project (3GPP) interfaces, Long Term Evolution (LTE) interfaces, and custom interfaces.

In an embodiment, the application is a traffic manager.

In an embodiment, the program commands further cause the processor to register a second application, wherein registering the second application includes registering the second application as publishing a first type of data, registering the second application as subscribing to a second type of data, or both.

In an embodiment, the program commands further cause the processor to provide a parser interface, wherein registering the second application is performed using the parser interface.

In an embodiment, when the first application is registered as subscribing to the filtered data, the filtered data is provided to the first registered application in response to receiving the data.

In an embodiment, receiving the data includes receiving the data from the second application only if the second application is registered to publish the type of data associated with the data.

In an embodiment, storing the filtered data in the metric storage is performed only if an application is registered as subscribing to the filtered data.

In an embodiment, filtering the parsed data includes corroborating the parsed data received over a first interface of the plurality of input interfaces with first other parsed data received over the first interface, linking the corroborated parsed data with second other parsed data received over the first interface, and linking the parsed data with third other parsed data received over a second interface of the plurality of input interfaces different than the first interface.

In an embodiment, parsing the data includes parsing the data according to the input interface the data was received through.

BRIEF DESCRIPTION OF THE DRAWINGS

FIG. 25 illustrates a timeline of events that may generate messages processed by an MPC according to an embodiment.

DETAILED DESCRIPTION

Embodiments of the present disclosure relate to a system that takes in various data streams and metrics from a variety of networking applications and organizes, filters, consolidates and coordinates access/delivery of this data to various other virtual networking functions/applications (VNFs) which have registered to receive and/or access this information. According to various embodiments, this system enables the virtualized applications to operate on real-time collective data of a collective group to improve network speed, capacity, efficiency, etc. In various embodiments, this system also provides a framework for virtualized networking functions and applications to register to both send (e.g., publish) and receive (e.g., subscribe to) data within the collective group.

The present disclosure relates to a system that aggregates multiple interfaces into a repository of data that is accessible and useable by both standard and non-standard network applications, and allows the information at any point within the end-to-end transport network to be collectively shared in a practical way amongst both standard and non-standard devices and applications.

According to various embodiments, the system enables a Traffic Manager, or any other network equipment, to access relevant information within an end-to-end transport network in a single repository and in a single format.

Figure 1:
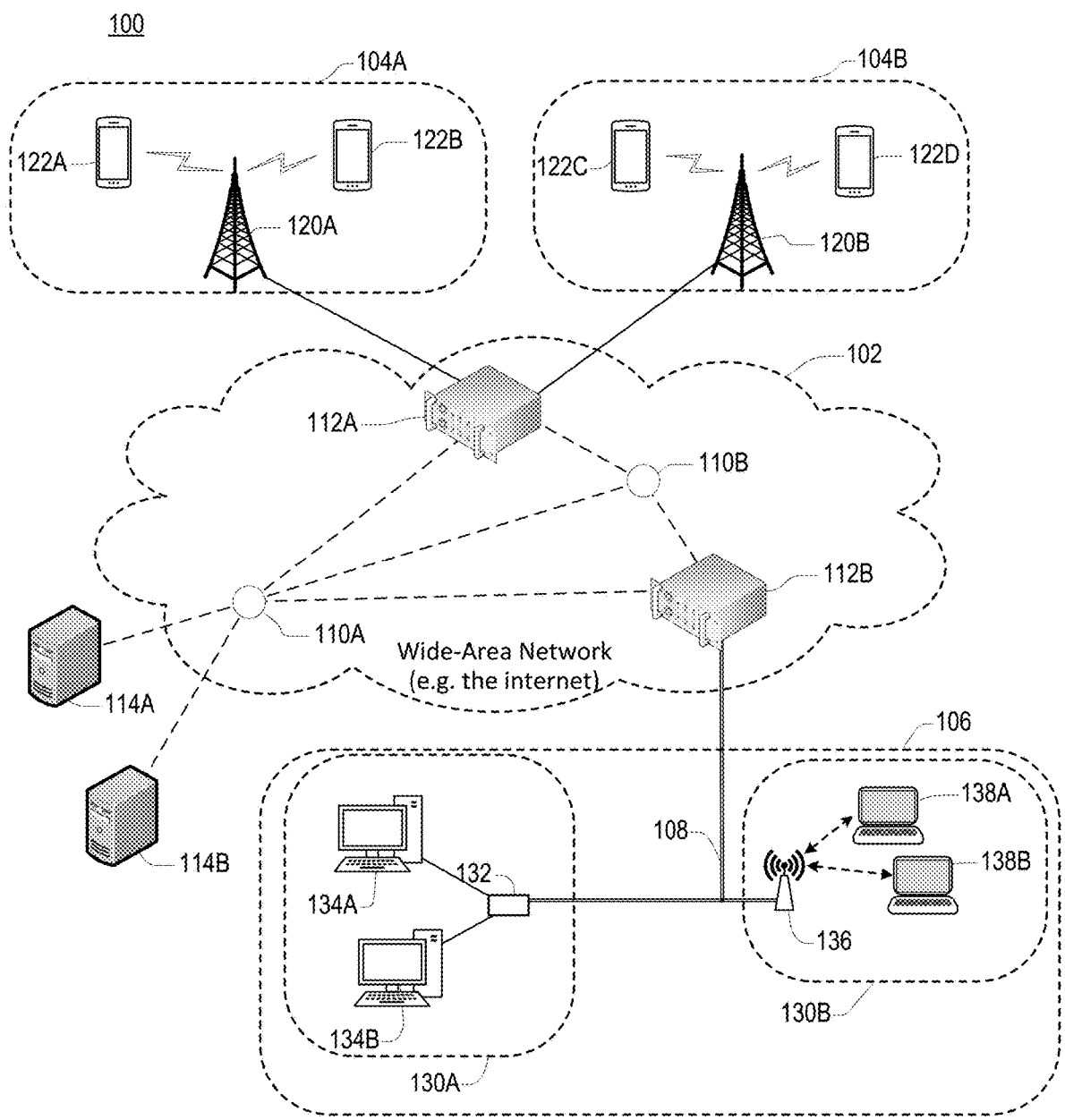
FIG. 1 illustrates a communication network according to an embodiment.

FIG. 1 illustrates a communication network 100 according to an embodiment. The network 100 includes a Wide-Area Network (WAN) 102 (for example, the Internet), a plurality of cellular Radio Access Networks (RANs) 104A and 104B, a cable or DSL based Internet Access Network (IAN) 106, and a plurality of servers 114A and 114B attached to the WAN 102. However, embodiments are not limited thereto.

The WAN 102 includes a plurality of routers 110A and 110B, a first gateway 112A, and a second gateway 112B all in direct or indirect communication with each other. The routers 110A and 110B operate at a networking layer of a protocol stack (for example, at the Internet Protocol (IP) later of a TCP/IP Protocol stack) to route packets. That is, the routers 110A and 110B perform their functions using information provided in the IP headers of an IP datagram.

The gateways 112A and 112B operate at a transport layer or higher of a protocol stack. For example, the gateways 112A and 112B may operate using information in User Datagram Protocol (UDP) headers, Transmission Control Protocol (TCP) headers, and/or other transport layer protocol headers, the transport layer protocol headers being encapsulated in the IP data of IP datagrams.

In an embodiment, first gateway 112A may be implemented using a gateway VNF running on commodity server hardware. In such an embodiment, additional VNFs may be provided on the gateway 112A.

For example, the first gateway 112A may also function as an aggregation point for the RANs 104A and 104B. Furthermore, the first gateway 112A may provide transport management and monitoring and control functions for the RANs 104A and 104B. The first gateway 112A may communicate with the RANs 104A and 104B through a backhaul network.

Similarly, the second gateway 112B may be implemented using a gateway VNF and may provide additional VNFs such as acting as an aggregation point for the IAN 106, providing transport management, monitoring, and control functions for the IAN 106, and providing transport optimization for the IAN 106, including real-time optimization of fair-share transport protocols in response to congestion on the IAN 106.

The first RAN 104A includes a base station 120A and a plurality of User Equipment (UEs) 122A and 122B wirelessly communicating with the first base station 120A over a shared radio-frequency (RF) resource. The second RAN 104B includes a base station 120A and a plurality of UEs 122C and 122D wirelessly communicating with the second base station 120B over the shared RF resource. The UEs 122A to 122D communicate with the WAN 102 via the base stations 120A and 120B and the first gateway 112A. The base stations 120A and 120B may be Evolved Node Bs (eNodeBs), Base Transceiver Stations (BTSs), or the like, and the UEs 122A to 122D may be cellular phones, wireless hotspots, computers with cellular modems, or the like, but embodiments are not limited thereto.

The IAN 106 includes a shared wired resource 108 (for example, a coaxial cable, fiber optic cable, or the like, or combinations thereof) connecting a plurality of Local Area Networks (LANs) 130A and 130B to the second gateway 112B. Devices on the LANs 130A and 130B may compete for the finite bandwidth of the shared wired resource 108.

A first LAN 130A may include a combined modem and router 132 for connecting devices on the first LAN 130A to the WAN 102 through the shared wired resource 108. A plurality of networked devices 134A and 134B may be connected to the combined modem and router 132 by, for example, 1000Base-T Ethernet over copper wires.

A second LAN 130B may include a combined modem, router, and wireless Access Point (AP) 136 for connecting devices on the second LAN 130B to the WAN 102 through the shared wired resource 108. The second LAN 130B may therefore be a Wireless LAN (WLAN). A plurality of stations (STAs) 138A and 138B may be wireless connected to the combined modem, router, and AP 136 using, for example, Wi-Fi™ technology using a shared radio-frequency resource.

First and second servers 114A and 114B may provide services to devices connected to the WAN 102. Examples of services that may be provided include cloud computing, cloud storage, social networking, streaming video, and the like. The services may be provided as VNFs.

Figure 2:
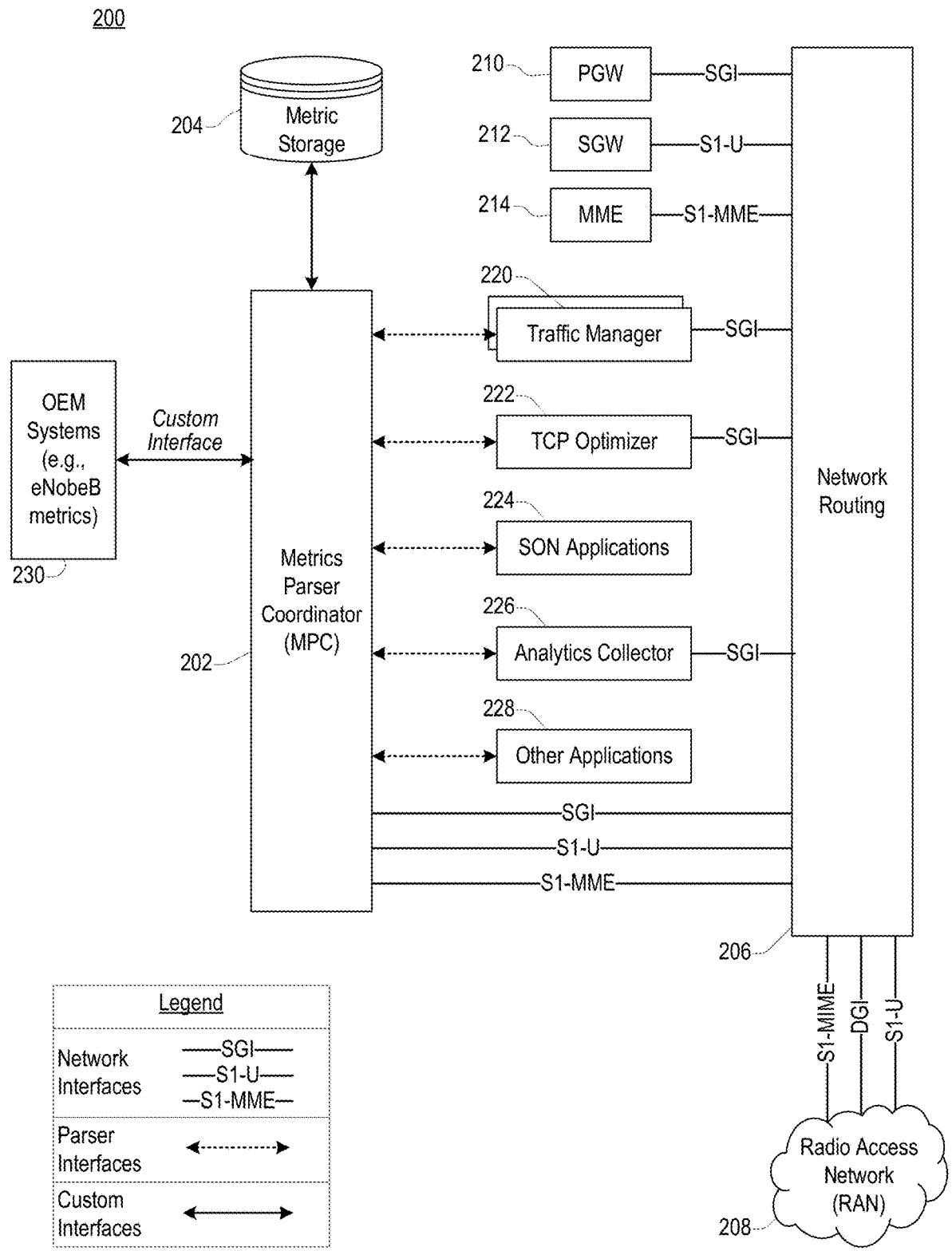
FIG. 2 illustrates a system for collecting, filtering, and providing information according to an embodiment.

FIG. 2 illustrates a system 200 according to an embodiment of the present disclosure. The system 200 includes a Metrics Parser Coordinator (MPC) 202 and a metric storage 204, which communicate with each other using a custom interface. The system 200 may also include a network routing subsystem 206 and a Radio Access Network (RAN) 208.

The system 200 may also include a variety of network functions, including a Public Data Network (PDN) Gateway (PGW) 210, a Software Gateway (SGW) 212, a Mobile Management Entity (MME) 214, a Traffic Manager 220, a Transmission Control Protocol (TCP) Optimizer 222, on or more Self-Organizing Network (SON) applications 224, an Analytics Collector 226, and one or more Other Applications 228. One, some, or all of the PGW 210, the SGW 212, the MME 214, the Traffic Manager 220, the TCP Optimizer 222, the SON Applications 224, the Analytics Collector 226, and the Other Applications 228 may be implemented as VNFs.

The network functions may communicate with the other network functions and with the MPC 202 and RAN 208 through the network routing subsystem 206 and using on or more standard interfaces such as SGi, S1-U, and/or S1-MME. The network functions may also communicate with the MPC 202 via a parser interface of the MPC 202.

The system 200 may further include OEM systems 230, such as eNodeB metric systems. The OEM systems 230 may communicate with the MPC 202 as other network functions do (i.e., through standard interfaces), or (as shown here) over a custom interface to the MPC 202.

The MPC 202 may be implemented as a VNF or as custom software running on custom hardware. The Metric Storage 204 may be implemented as one or more databases hosted by a database server.

The MPC 202, using the Metric Storage 204, coordinates data sharing between the other components of the system 200. Coordinating data sharing may include transforming information to and from proprietary formats, thereby providing data to an application or function from a variety of different sources in a uniform fashion.

In this disclosure, applications includes network functions implemented on dedicated hardware, network functions implemented as VNFs, and other functions that use or produce data that may be received and distributed by the MPC 202.

To facilitate information sharing, applications may register with the MPC 202. Applications may register using one or more parser interfaces of the MPC 202.

Registration may include specifying the data the application wishes to receive, such as, for example, information regarding which users are in one or more specified cells of a RAN or when a specified user moves from one cell to another or from one network to another.

Registration may also include specifying what information the application may provide, such as, for example, real-time information on a congestion level of a cell or other network component.

The MPC 202 may combine two pieces of information to determine a third piece of information. For example, the MPC 202 way use a location of an identifier (ID) and an ID of a user to determine a location of the user.

The MPC 202 may receive and transmit user data and control data over Network Data Interfaces such as SGi, S1-U, and S1-MME. This data may first pass through the Network Routing subsystem 206 before being passed to the PC 202. The MPC may also send and receive information over custom data interfaces, such as shown for the OEM systems 230.

The parser interface of the MPC 202 allows applications to:
  specify which data should be forwarded from the MPC 202 to the application,
  publish data to the MPC 202, and
  access data within the MPC 202 to receive filtered, correlated data.
The MPC 202 may:
  Parse incoming data and filter it such that only information that has been requested by a registered application is recorded.
  Forward data either on-demand or automatically to registered applications.
  Store the filtered information to a storage medium for later use.
  Build consolidated correlations of data, such as mapping common data received from different input interfaces.
  Act as an information rendezvous between multi-node applications, where each application submits its information and the MPC updates each application with a global view of the data.

Non-Standard and Standard applications can be built against the Parser Interface to form a coordinated suite of networking components.

Figure 3:
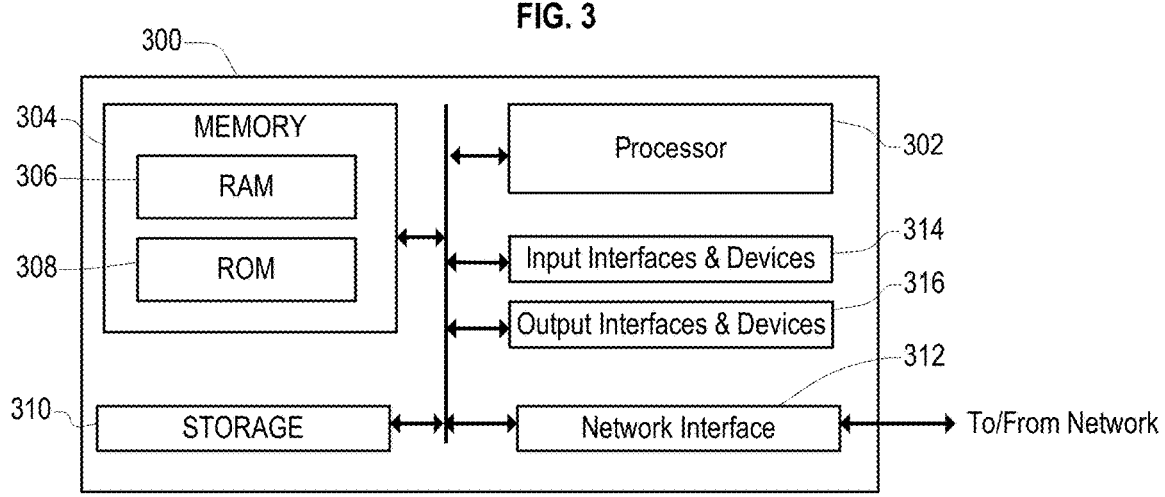
FIG. 3 illustrates a computer system according to an embodiment.

FIG. 3 illustrates a computer system 300, which may be used to implement an embodiment. The computer system 300 may implement an embodiment by, for example, executing computer programming instructions stored in a non-transitory computer readable medium.

The computer system 300 may include one or more of a processor 302, a memory 304, input interfaces and devices 314, output interfaces and devices 316, and a storage 310, each of which communicates with each other through a bus, fabric, or other interconnect technology. The computer system 300 may also include one or more network interfaces 312 coupled to a network. For example, in embodiments, the computer system 300 may include a network interface 312 for each physical layer network connection of the computer system 300.

The processor 302 may be a central processing unit (CPU) or a semiconductor device that executes processing instructions stored in the memory 304 and/or the storage 310. The memory 304 and the storage 310 may include various forms of volatile or non-volatile storage media. For example, the memory 304 may include a read-only memory (ROM) 308 and a random access memory (RAM) 306, and the storage may include a Hard Disk Drive (HDD), a Solid State Drive (SSD), or the like.

Figure 4:
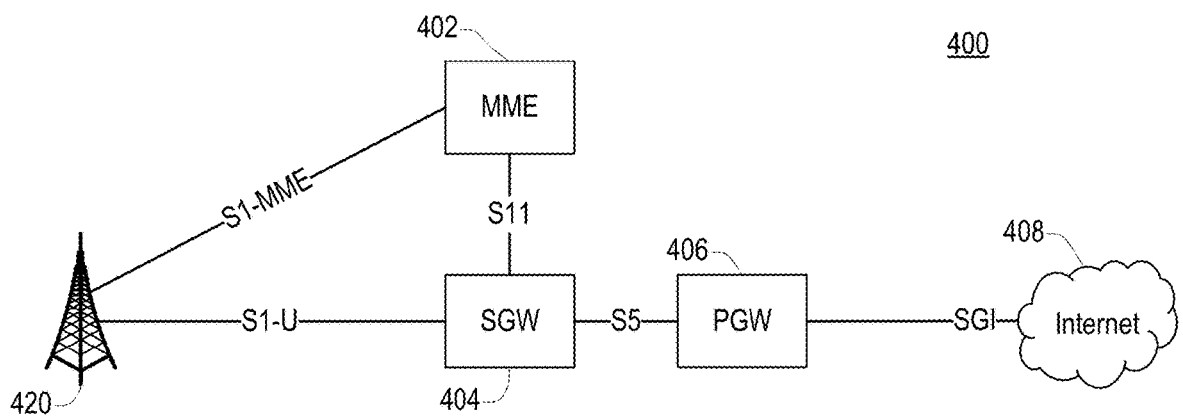
FIG. 4 illustrates a network according to an embodiment.

FIG. 4 illustrates a network 400 according to an embodiment. The network 400 includes a Mobile Management Entity (MME) 402, a Serving Gateway (SGW) 404, a PDN Gateway (PGW) 406.

The MME 402 communicates with a base station 420 using an S1-MIME interface and communicates with the SGW 404 using an S11 interface. The base station 420 may be a base station 120 as shown in FIG. 1.

The SGW 404 communicates with the base station 120 using an S1-U interface and communicates with the PGW 406 using an S5 interface. The PGW 406 communicates with an internet 408 using an SGi interface.

The interfaces shown include interfaces for passing user data (e.g., S1-U and SGi), interfaces for network control signaling (e.g. S1-MME and S11), and interfaces for doing both (e.g. S5). Embodiments operate to collect, store, filter, and selectively provide information collected from the various interfaces.

Figure 5:
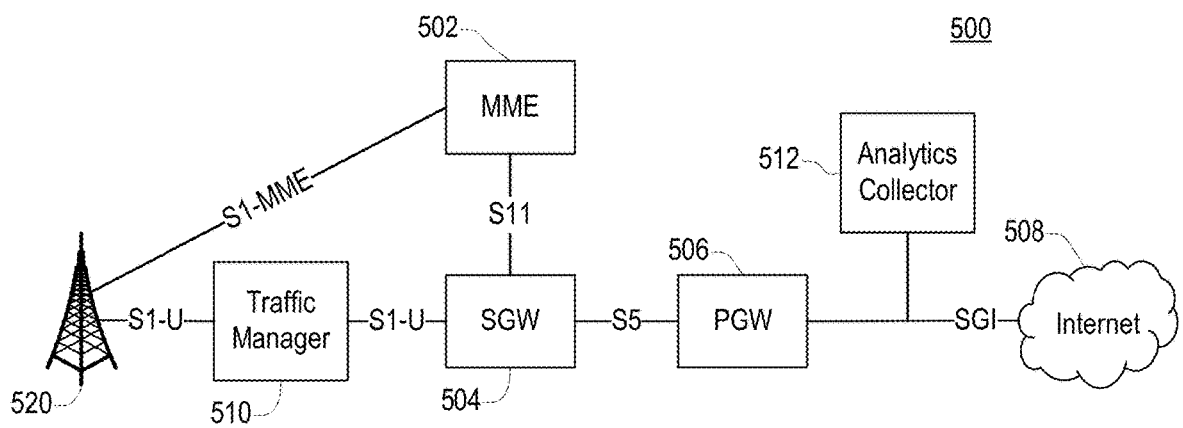
FIG. 5 illustrates a network according to another embodiment.

FIG. 5 illustrates a network 500 according to another embodiment of the present disclosure. Except as noted, elements of FIG. 5 having a reference characters 5xx correspond to features having a reference character 4xx in FIG. 4, and descriptions thereof are therefore omitted for brevity. In addition to the elements of the network 400, the network 500 includes a Traffic manager 510 and an Analytics Collector 512.

In the network 500, the SGW 504 communicates with the base station through the Traffic Manager 510, using S1-U interfaces. The Analytic Collector monitors communications performed using the SGi interface between the PGW 506 and the internet 508.

The Traffic Manager 510 and the Analytics Collector 512 may be non-standard applications in the mobile network. In the network 500, the Traffic Manager 510 and the Analytics Collector 512 operate using the same standard data interfaces as other elements of the network 500, and could exist on any of the interface. In addition, the non-standard applications may provide non-standard interfaces for performing some communications.

Figure 6:
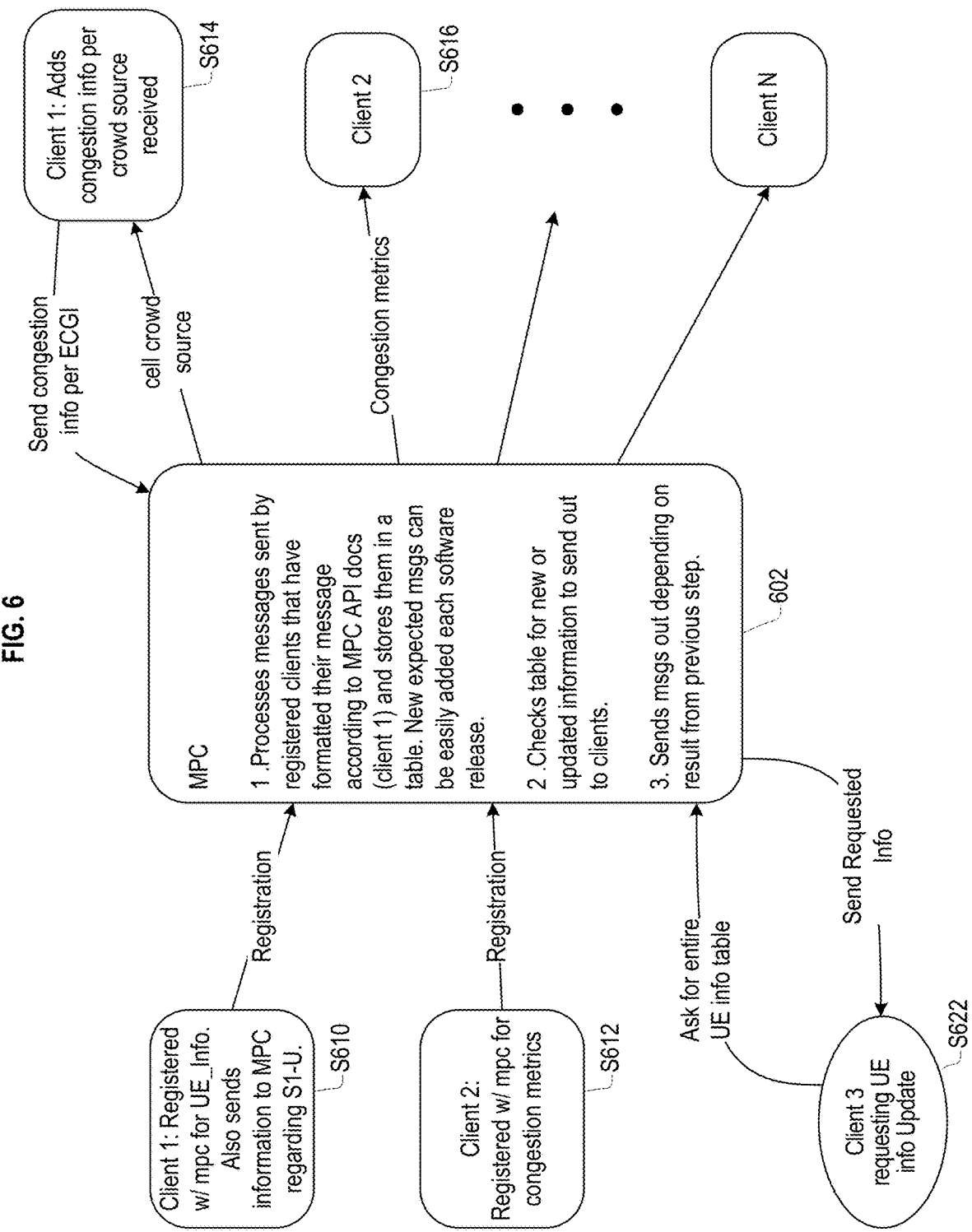
FIG. 6 illustrates operation of a Metrics Parser Coordinator (MPC) according to an embodiment.

FIG. 6 illustrates operations of an MPC 602 according to an embodiment. The MPC 602 may be the MPC 202 of FIG. 2.

The MPC 602 registers clients. Clients may register what information they provide, and may register what information they which to receive and how they wish to receive it. Applications may register to send and receive information about ECGI, congestion ratio, flow type counts, and the like. Applications that register may be considered clients.

To interact with MPC 602, a client must first send a registration message declaring the types of messages it wishes to publish and receive. This information will be associated with the client's endpoint and stored for future reference. In embodiments, the registration message may include one, some, or all of an indication of whether the client is registering or unregistering, on or more indications of events that the client will either publish or subscribe to, and so on.

Every time the MPC 602 has a message to send, it iterates through all registered clients, determines which clients registered to receive that message, and then sends the message to those clients. When the MPC 602 receives a message, it checks whether the sender is registered to publish that message type as a condition to processing the message.

The MPC 602 will send an acknowledgement to the client after it successfully processes the registration message so that the client knows the connection is established and that the client may start publishing messages.

For example, at S610, a first client registers with the MPC 602 to receive User Equipment (UE) info, and to provide S1-U information, such as congestion information.

At S612, a second client registers with the MPC 602 to receive congestion metrics.

The MPC 602 processes messages sent by the registered clients, wherein the messages are formatted according to the Application Programming Interface (API) of the MPC 602. The MPC 602 stores the information from the received messages in one or more tables. The use of the MPC API allows new messages to be easily added to the API with each release of the software that implements the MPC 602.

For example, at S614, in responds to a message from the MPC 602 indicating a crowd source identified by an E-UTRAN Cell Global Identifier (ECGI), the first client may send the MPC 602 a message including congestion info corresponding to that ECGI. The MPC 602 may then process and store the congestion information.

The MPC 602 detects when there is new or updated information that a client has registered to receive, and may deliver it to the client in accordance with the relevant registration parameters (for example, whether the client wishes data pushed out to it, and how often).

For example, the MPC 602 may detect that at S612, the second client may have registered to receive the congestion information sent to the MPC 602 by the first client at S614.

When new or updated information requested by a client is detected, the MPC 602 may send a message to the client, the message including the new or updated information.

For example, in response to detecting that the congestion information sent to the MPC 602 at S614 was requested during registration of the second client, at S616 the MPC 602 may send the congestion info to the second client.

The MPC 602 may also respond immediately to data requests. For example, at S622, a third client requests all the information in a UE information table, and the MPC 602 responds by sending the third client the requested info.

In embodiments, an MPC such as the MPC 602 may perform one or more of its functions using any, some, or all of an S1 Application Protocol (S1AP) session table, a General Packet Radio Service (GPRS) Tunneling Protocol (GTP) session table, a session linking table that associates S1AP sessions with GTP sessions, an Initiating Message table for use as described below, a location tracking table, a total linked session counter, a linked session counter, and so. In embodiments, one, some, or all of the S1AP session table, the GTP session table, the session linking table, and the location tracking table may each include one or more tables in one or more databases, which may be postgres databases.

FIGS. 7-24 illustrate processes that may be performed by an MPC according to an embodiment.

FIGS. 7-19 illustrate processes performed by an MPC after receiving a packet including the respectively specified type of message in order to process that type of message, as described below. In embodiments, messages processed by an MPC may include one, some or all of the following information:

MME UE S1AP ID: a unique ID for a UE on an MME.
eNB UE S1AP ID: a globally unique ID given to the eNodeB
Transport Layer Address: the UE local IP address.
UE Aggregate Maximum Bit Rate: this is applicable for all non-GBR bearers per UE which is defined by the downlink and uplink direction provided by the MME to the eNodeB. It may include a UE Aggregate Maximum Bit Rate Downlink and a UE Aggregate Maximum Bit Rate Uplink.
E-UTRAN CGI: an element is used to globally identify a cell.
TAI: an identifier to uniquely identify a tracking area.
Src_IP or Dst_IP: a source IP address, a destination IP address, or both. For a message from an eNodeB, the Src_IP is the eNodeB IP address.

Figure 7:
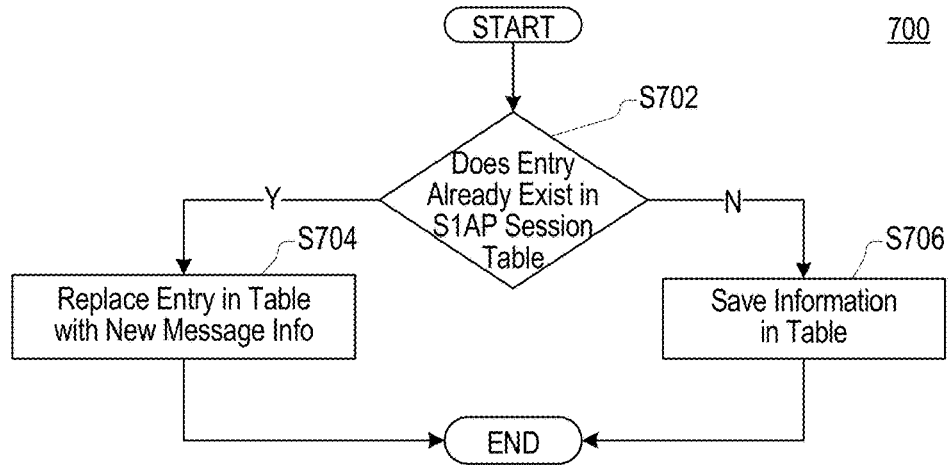
FIG. 7 illustrates a process for handling Initial UE messages, according to an embodiment.

FIG. 7 illustrates a process 700 for processing an Initial User Equipment (UE) message, according to an embodiment. The process 900 may be performed by an MPC, such as the MPC 202 of FIG. 2. The Initial UE message may be a message sent from an eNodeB of a RAN to an MME in response a UE being turned on in the coverage area of the eNodeB.

At S702, the process 700 determines whether an entry exists for the UE in an S1AP session table. A key used to index the S1AP session table may be an eNodeB IP address and an ID assigned to the UE by the eNodeB. In response to the entry for the UE existing in the S1AP session table, the process 700 proceeds to S704; otherwise, at S702 the process 700 proceeds to S706.

In an embodiment, the Initial UE Message does not contain enough information to map the ECGI to a specific UE; such information may not be available until an Initial Context Setup Request (Successful Message) and a Create Session Response have been received. Therefore, embodiments may include a "partial picture" table called an Initiating Message Table. This table has the eNB UE S1AP ID+eNB IP as the key and all of the tracking information (ECGI, UE Src IP, TAI) as the values. A combination must be used for the key since eNB UE S1AP ID is not globally unique.

Once an Initial Context Setup Request and Response are received then a S1AP Session will be created in the S1AP Session table. Furthermore, a lookup will need to be performed on the Session Linking table to see if the new S1AP Session needs to be linked to a GTP Session.

At S704, the process 700 replaces or updates the existing entry for the UE in the S1AP session table with a new entry based on the information in the Initial UE message. The process 700 then exits.

At S706, the process 700 creates a new entry for the UE in the S1AP session table based on the information in the Initiating UE message. The process 700 then exits.

Figure 8:
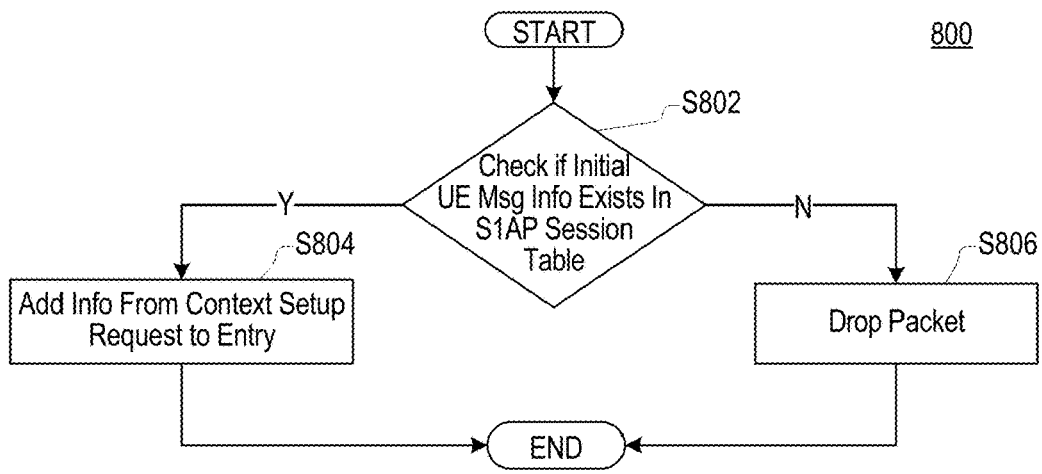
FIG. 8 illustrates a process for handling Initial Context Setup Request Initiating messages, according to an embodiment.

FIG. 8 illustrates a process 800 for processing an Initial Context Setup Request Initiating message, according to an embodiment. The process 900 may be performed by an MPC, such as the MPC 202 of FIG. 2. The Initial Context Setup Request Initiating message may be a message sent from to an eNodeB of a RAN by an MME in response to a UE trying to connect to the RAN, and may establish the necessary overall initial UE Context including a Security Key, a Handover List, a UE Radio capability and a UE Security Capabilities, and so on.

At S802, the process 800 determines whether initial message information for the UE exists in an S1AP session table. In an embodiment, a key used to index the S1AP session table may be an eNodeB IP address and an ID assigned to the UE by the eNodeB. In an embodiment, a key used to index the table may be a UE IP address. In response to the initial message information for the UE existing in the S1AP session table, the process 800 proceeds to S804; otherwise, at S802 the process 800 proceeds to S806.

At S804, the process 800 adds the information in the Initial Context Setup Request Initiating message to the entry for the UE in the S1AP session table. The process 800 then exits.

At S806, the process 800 drops the packet including the message without further processing. The process 800 then exits.

Figure 9:
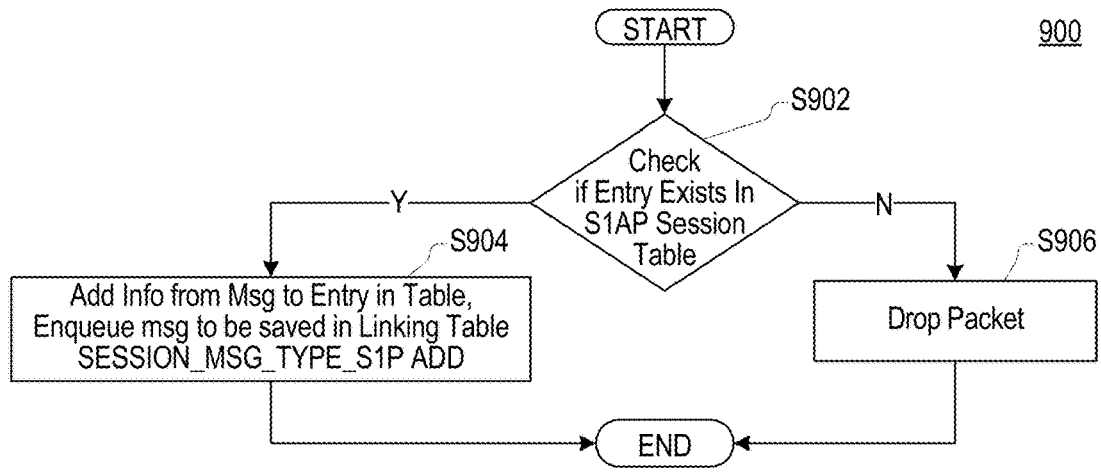
FIG. 9 illustrates a process for handling Initial Context Setup Request Successful Outcome messages, according to an embodiment.

FIG. 9 illustrates a process 900 for processing an Initial Context Setup Request Successful Outcome message, according to an embodiment. The process 900 may be performed by an MPC, such as the MPC 202 of FIG. 2. The Initial Context Setup Request Successful Outcome message may be a message sent from an eNodeB of a RAN to an MME in response to a UE successfully completing a connection to the RAN.

At S902, the process 900 determines whether an entry for the UE exists in an S1AP session table. In response to the entry for the UE existing in the S1AP session table, the process 900 proceeds to S904; otherwise, at S902 the process 900 proceeds to S906.

At S904, the process 900 adds the information in the Initial Context Setup Request Successful Outcome message to the entry for the UE in the S1AP session table. The process 900 also enqueues a message to be save in a session linking table, the message being of type SESSION_MSG_TYPE_S1P ADD. The process 900 then exits.

At S906, the process 900 drops the packet including the message without further processing. The process 900 then exits.

Figure 10:
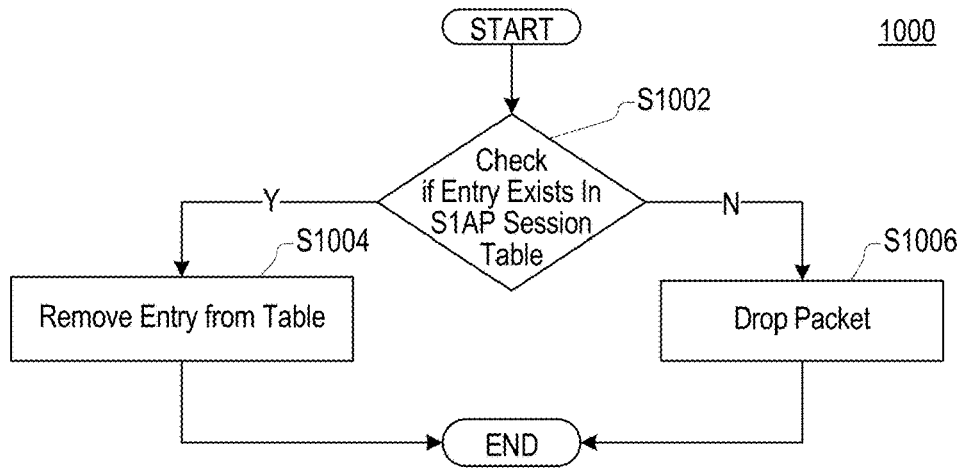
FIG. 10 illustrates a process for handling Initial Context Setup Request Unsuccessful Outcome messages, according to an embodiment.

FIG. 10 illustrates a process 1000 for processing an Initial Context Setup Request Unsuccessful Outcome message, according to an embodiment. The process 1000 may be performed by an MPC, such as the MPC 202 of FIG. 2 The Initial Context Setup Request Unsuccessful Outcome message may be a message sent from an eNodeB of a RAN to an MME in response to a UE unsuccessfully completing an attempted connection to the RAN.

At S1002, the process 1000 determines whether an entry for the UE exists in an S1AP session table. In response to the entry for the UE existing in the S1AP session table, the process 1000 proceeds to S1004; otherwise, at S1002 the process 1000 proceeds to S1006.

At S1004, the process 1000 removes the entry for the UE from the S1AP session table. The process 1000 then exits.

At S1006, the process 1000 drops the packet including the message without further processing. The process 1000 then exits.

Figure 11:
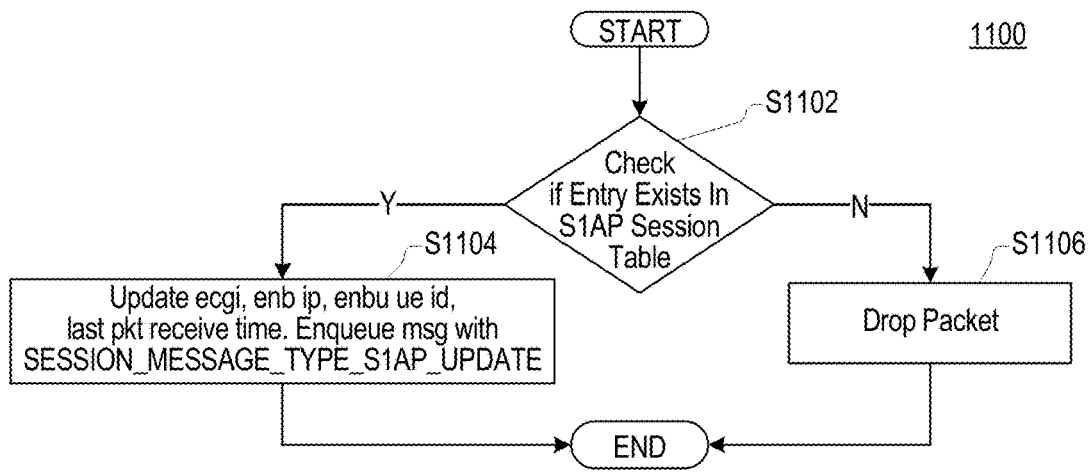
FIG. 11 illustrates a process for handling S1AP Handover Notify messages, according to an embodiment.

FIG. 11 illustrates a process 1100 for processing a S1AP Handover Notify message, according to an embodiment. The process 1100 may be performed by an MPC, such as the MPC 202 of FIG. 2. The S1AP Handover Notify message may be a message sent from an eNodeB of a RAN to an MME in response to a UE arriving in and being successfully handed over to a target cell of the RAN.

At S1102, the process 1100 determines whether an entry for the UE exists in an S1AP session table. In response to the entry for the UE existing in the S1AP session table, the process 1100 proceeds to S1104; otherwise, at S1102 the process 1100 proceeds to S1106.

At S1104, the process 1100 uses the information in the S1AP Handover Notify message to update the entry for the UE in the S1AP session table and a location tracking table. The information may include an ECGI identifier, an eNodeB IP, an eNodeB UE ID, a last packet receive time, and so on. The process 1100 also enqueues a message to be saved in a session linking table, the type of the message being SESSION_MESSAGE_TYPE_S1AP_UPDATE. The process 1100 then exits.

At S1106, the process 1100 drops the packet including the message without further processing. The process 1100 then exits.

Figure 12:
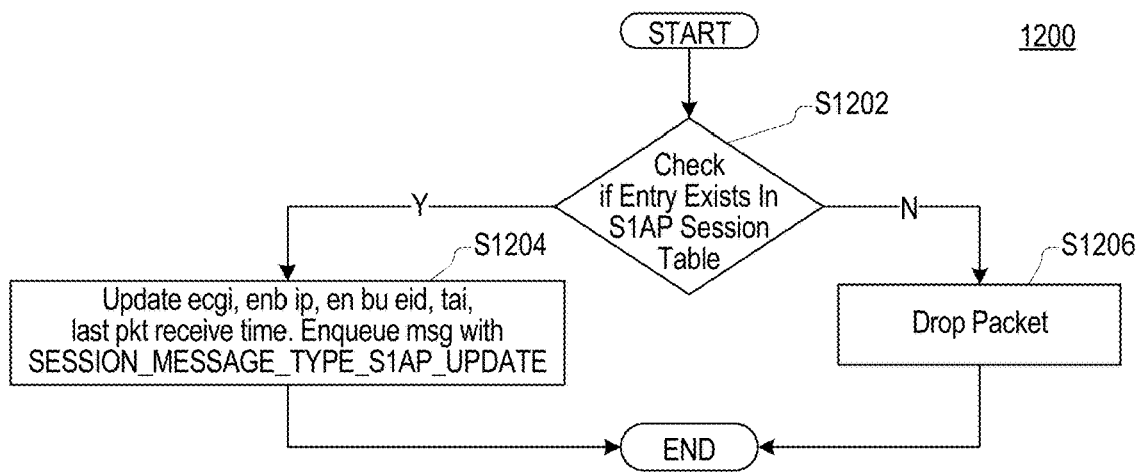
FIG. 12 illustrates a process for handling S1AP Location Report messages, according to an embodiment.

FIG. 12 illustrates a process 1200 for processing a S1AP Location Report message, according to an embodiment. The process 1200 may be performed by an MPC, such as the MPC 202 of FIG. 2. The S1AP Location Report message may be a message sent from an eNodeB of a RAN to an MME to indicate the presence of a connected UE in a target cell of the RAN.

At S1202, the process 1200 determines whether an entry for the UE exists in an S1AP session table. In response to the entry for the UE existing in the S1AP session table, the process 1200 proceeds to S1204; otherwise, at S1202 the process 1200 proceeds to S1206.

At S1204, the process 1200 uses the information in the S1AP Location Report message to update the entry for the UE in the S1AP session table and a location tracking table. The information may include an ECGI identifier, an eNodeB IP, an eNodeB UE ID, a last packet receive time, and so on. The process 1200 also enqueues a message to be save in a session linking table, the type of the message being SESSION_MESSAGE_TYPE_S1AP_UPDATE. The process 1200 then exits.

At S1206, the process 1200 drops the packet including the message without further processing. The process 1200 then exits.

Figure 13:
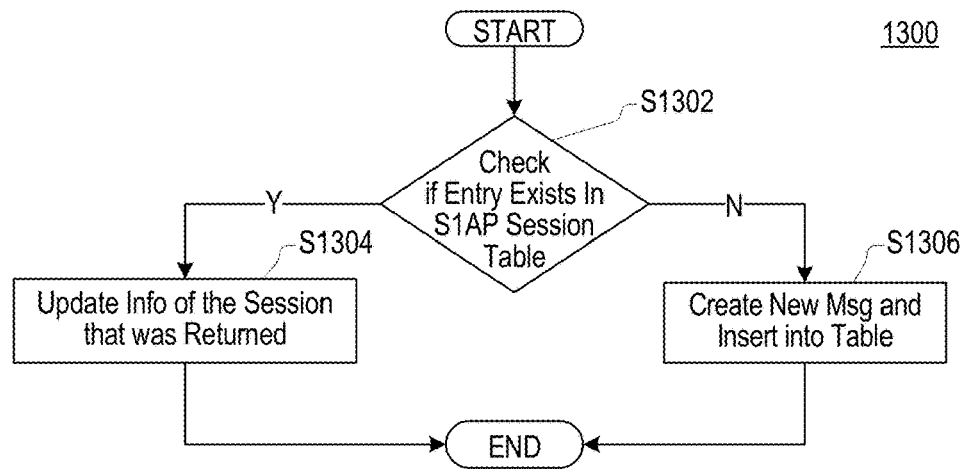
FIG. 13 illustrates a process for handling S1AP Path Switch Initiating messages, according to an embodiment.

FIG. 13 illustrates a process 1300 for processing a S1AP Path Switch Initiating message, according to an embodiment. The process 1300 may be performed by an MPC, such as the MPC 202 of FIG. 2. The S1AP Path Switch Initiating message is sent to request the switch of a downlink GTP tunnel associated with a UE towards a new GTP tunnel endpoint so that a handover of the UE to a new eNodeB may be performed correctly.

At S1302, the process 1300 determines whether an entry for the UE exists in an S1AP session table. In response to the entry for the UE existing in the S1AP session table, the process 1300 proceeds to S1304; otherwise, at S1302 the process 1300 proceeds to S1306.

At S1304, the process 1300 uses the information in the S1AP Path Switch Initiating message to update the entry for the UE in the S1AP session table. The process 1300 then exits.

At S1306, the process 1300 creates a new message and inserts it as an entry for the UE in the S1AP session table. The process 1300 then exits.

Figure 14:
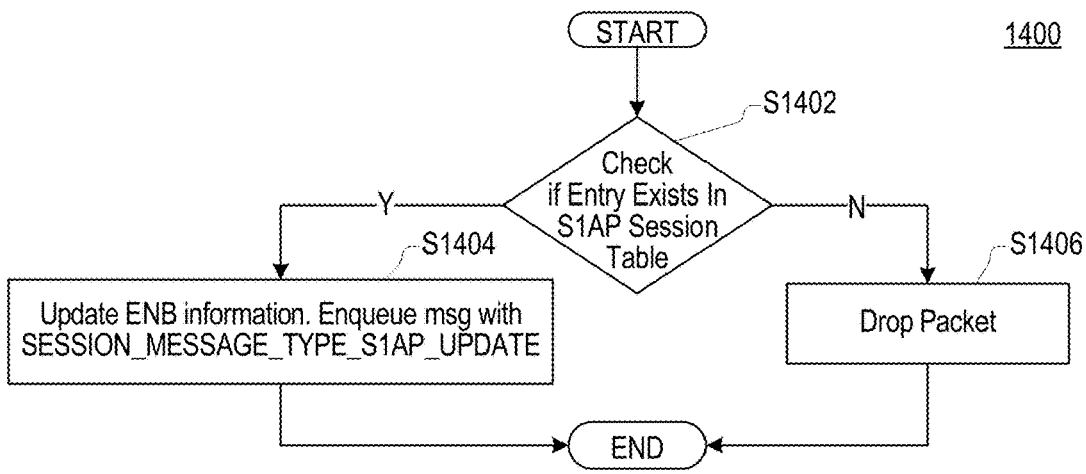
FIG. 14 illustrates a process for handling S1AP Path Switch Successful messages, according to an embodiment.

FIG. 14 illustrates a process 1400 for processing a S1AP Path Switch Successful message, according to an embodiment. The process 1400 may be performed by an MPC, such as the MPC 202 of FIG. 2. The S1AP Path Switch Successful message may be a message sent in response to the successful switching of a GTP tunnel associated with a UE to a new GTP endpoint, wherein the new endpoint is an eNodeB.

At S1402, the process 1400 determines whether an entry for the UE exists in an S1AP session table. In response to the entry for the UE existing in the S1AP session table, the process 1400 proceeds to S1404; otherwise, at S1402 the process 1400 proceeds to S1406.

At S1404, the process 1400 uses the information in the S1AP Path Switch Successful message to update the eNodeB (ENB) information for the UE in the S1AP session table. The process 1400 also enqueues a message to be save in a session linking table, the type of the message being SESSION_MESSAGE_TYPE_S1AP_UPDATE. The process 1400 then exits.

At S1406, the process 1400 drops the packet including the message without further processing. The process 1400 then exits.

Figure 15:
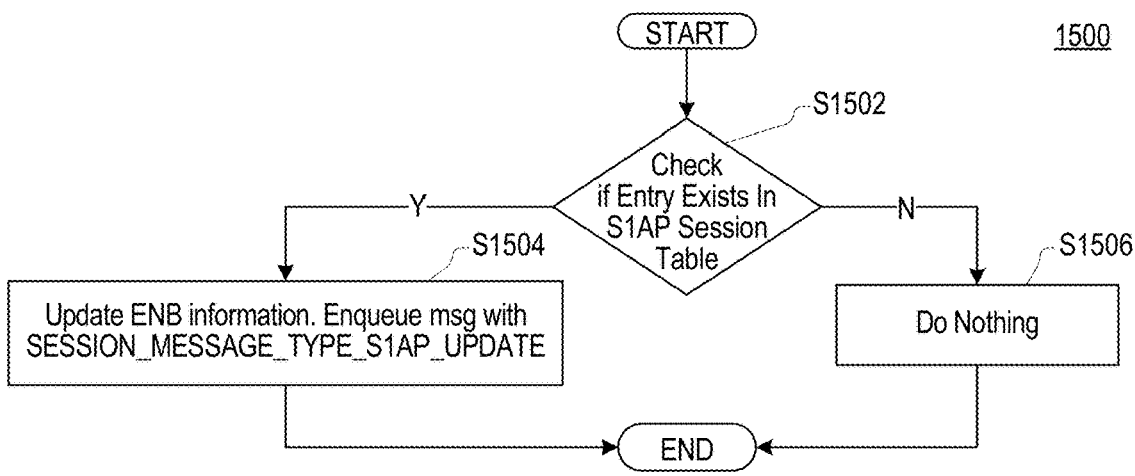
FIG. 15 illustrates a process for handling S1AP Path Switch Unsuccessful messages, according to an embodiment.

FIG. 15 illustrates a process 1500 for processing a S1AP Path Switch Unsuccessful message, according to an embodiment. The process 1500 may be performed by an MPC, such as the MPC 202 of FIG. 2. The S1AP Path Switch Unsuccessful message may be a message sent in response to a failed attempt to switch a GTP tunnel associated with a UE to a new GTP endpoint.

At S1502, the process 1500 determines whether an entry for the UE exists in an S1AP session table. In response to the entry for the UE existing in the S1AP session table, the process 1500 proceeds to S1504; otherwise, at S1502 the process 1500 proceeds to S1506.

At S1504, the process 1500 uses the information in the S1AP Path Switch Unsuccessful message to update the eNodeB (ENB) information for the UE in the S1AP session table. The process 1500 also enqueues a message to be save in a session linking table, the type of the message being SESSION_MESSAGE_TYPE_S1AP_UPDATE. The process 1500 then exits.

At S1506, the process 1500 does nothing and then exits.

Figure 16:
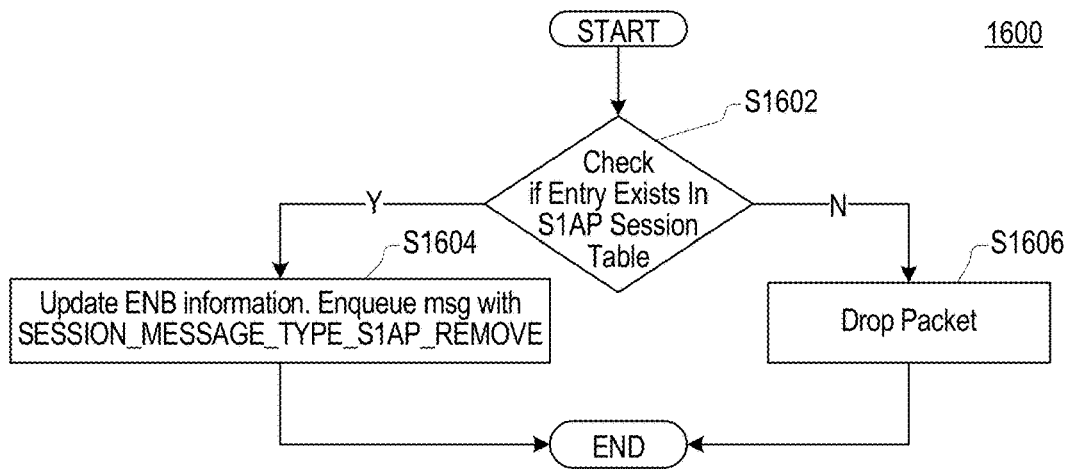
FIG. 16 illustrates a process for handling UE Context Release Response messages, according to an embodiment.

FIG. 16 illustrates a process 1600 for processing a UE Context Release Response message, according to an embodiment. The process 1600 may be performed by an MPC, such as the MPC 202 of FIG. 2. The UE Context Release Response message may be a message sent in response to an MME releasing a context of a UE, for example, in response to a bad signal.

At S1602, the process 1600 determines whether an entry for the UE exists in an S1AP session table. In response to the entry for the UE existing in the S1AP session table, the process 1600 proceeds to S1604; otherwise, at S1602 the process 1600 proceeds to S1606.

At S1604, the process 1600 uses the information in the UE Context Release Response message to update the eNodeB (ENB) information for the UE in the S1AP session table. The process 1600 also enqueues a message to be save in a session linking table, the type of the message being SESSION_MESSAGE_TYPE_S1AP_REMOVE. The process 1600 then exits.

At S1606, the process 1600 drops the packet including the message without further processing. The process 1600 then exits.

Figure 17:
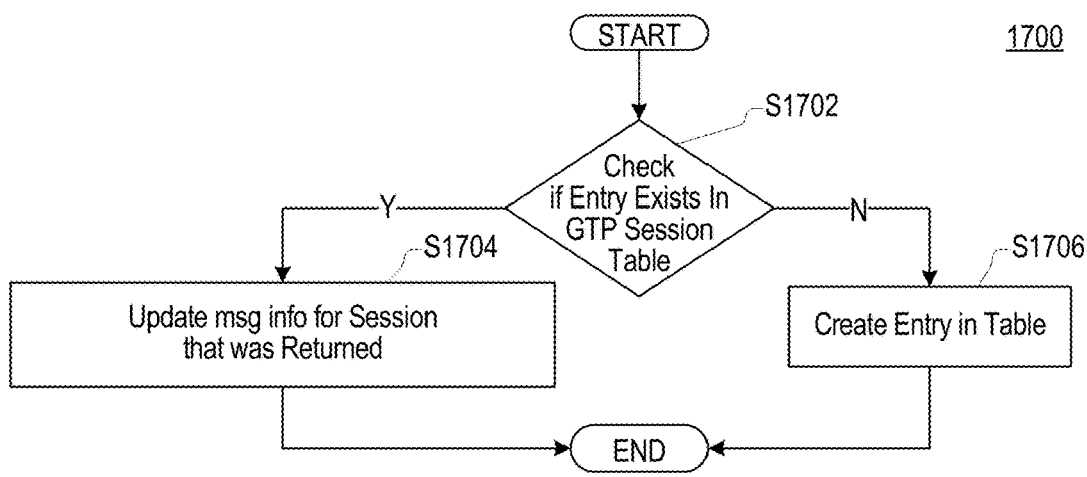
FIG. 17 illustrates a process for handling Create Session Request messages, according to an embodiment.

FIG. 17 illustrates a process 1700 for processing a Create Session Request message, according to an embodiment. The process 1700 may be performed by an MPC, such as the MPC 202 of FIG. 2. The Create Session Request message is sent by an SGW and/or MME as part of setting up an initial context for a UE.

At S1702, the process 1700 determines whether an entry for the UE exists in a GTP session table. In response to the entry for the UE existing in the GTP session table, the process 1700 proceeds to S1704; otherwise, at S1702 the process 1700 proceeds to S1706.

At S1704, the process 1700 uses the information in the Create Session Request message to update the entry for the UE in the GTP session table. The process 1700 then exits.

At S1706, the process 1700 uses the information in the Create Session Request message to create a new entry for the UE in the GTP session table. The process 1700 then exits.

Figure 18:
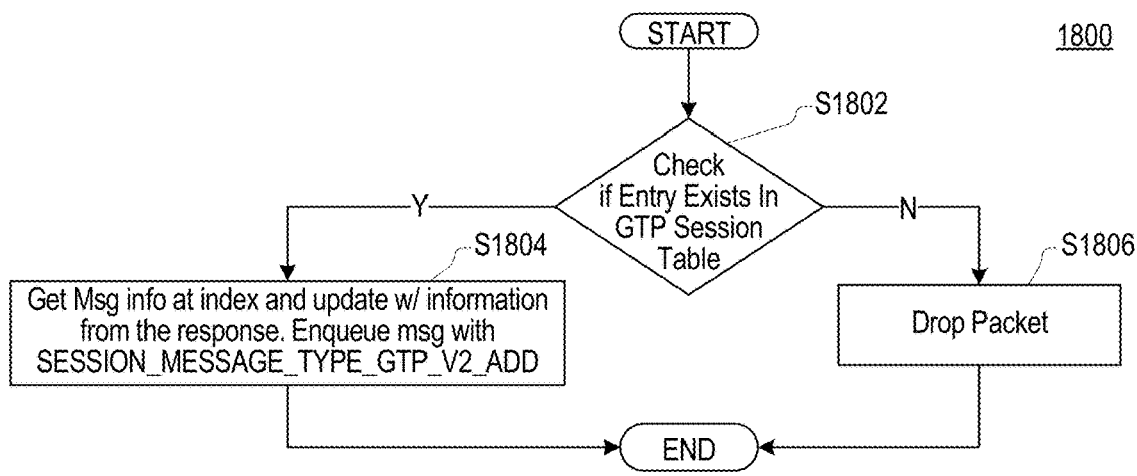
FIG. 18 illustrates a process Create Session Response messages, according to an embodiment.

FIG. 18 illustrates a process 1800 for processing a Create Session Response message, according to an embodiment. The process 1800 may be performed by an MPC, such as the MPC 202 of FIG. 2. The Create Session Response message may be sent from an SGW to an MME using an S11 interface as part of an initial context setup request process, to communicate an IP address assigned to the UE.

At S1802, the process 1800 determines whether an entry for the UE exists in a GTP session table. In response to the entry for the UE existing in the GTP session table, the process 1800 proceeds to S1804; otherwise, at S1802 the process 1800 proceeds to S1806.

At S1804, the process 1800 combines the information in the Create Session Response message with information at the index of the entry in the GTP session table to create a new entry in the GTP session table. The process 1800 also enqueues a message to be save in a session linking table, the type of the message being SESSION_MESSAGE_TYPE_GTP_V2_ADD. The process 1800 then exits.

At S1806, the process 1800 drops the packet including the message without further processing. The process 1800 then exits.

Figure 19:
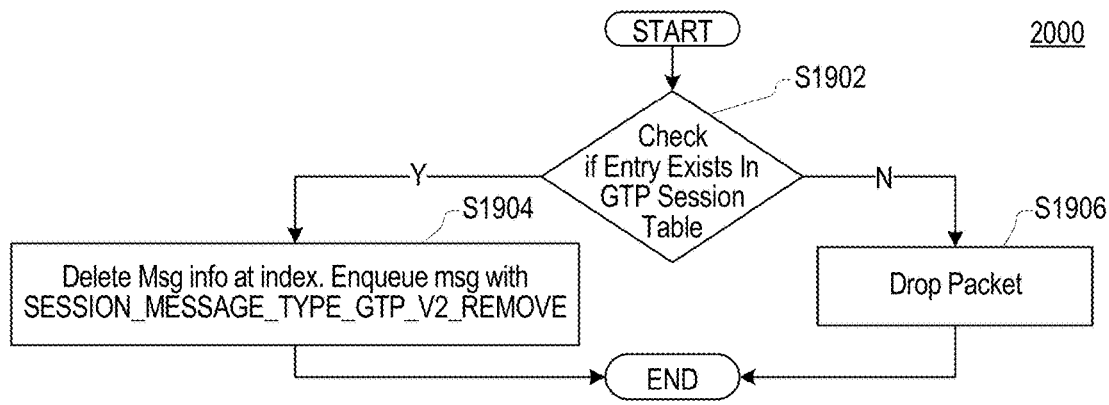
FIG. 19 illustrates a process for handling Delete Session Response messages, according to an embodiment.

FIG. 19 illustrates a process 1900 for processing a Delete Session Response message, according to an embodiment. The process 1900 may be performed by an MPC, such as the MPC 202 of FIG. 2. The Create Session Response message may be sent by an SGW or MME in order to release a context of a UE.

At S1902, the process 1900 determines whether an entry for the UE exists in a GTP session table. In response to the entry for the UE existing in the GTP session table, the process 1900 proceeds to S1904; otherwise, at S1902 the process 1900 proceeds to S1906.

At S1904, the process 1900 uses the information in the Create Session Response message to delete message information at the index of the entry in the GTP session table. The process 1900 also enqueues a message to be save in a session linking table, the type of the message being SESSION_MESSAGE_TYPE_GTP_V2_REMOVE. The process 1900 then exits.

At S1906, the process 1900 drops the packet including the message without further processing. The process 1900 then exits.

Figure 20A:
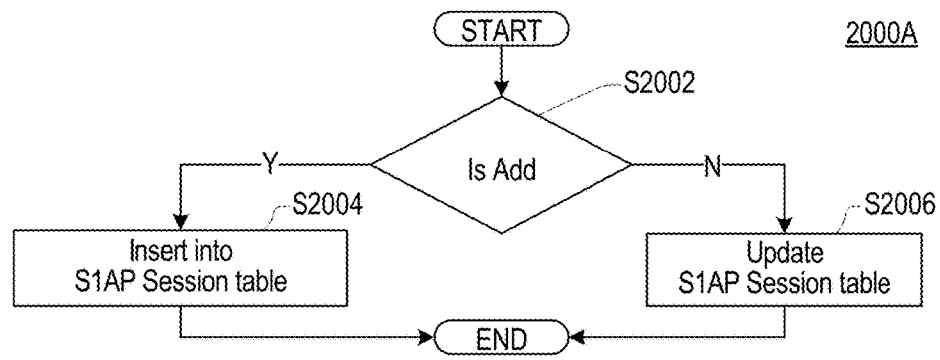
FIGS. 20A and 20B each illustrate a respective process for handling messages of type SESSION_MESSAGE_TYPE_S1AP_ADD or SESSION_MESSAGE_TYPE_S1AP_UPDATE, according to an embodiment.

FIG. 20A illustrates a process 2000A for processing messages of type SESSION_MESSAGE_TYPE_S1AP_ADD or SESSION_MESSAGE_TYPE_S1AP_UPDATE, according to an embodiment. The message may have been enqueued by one of the processes in FIGS. 7-19.

At S2002, the process 2000A determines whether the message is of type SESSION_MESSAGE_TYPE_S1AP_ADD. In response to the message being of type SESSION_MESSAGE_TYPE_S1AP_ADD, the process 2000A proceeds to S2004; otherwise, at S2002 the process 2000A proceeds to S2006.

At S2004, the process 2000A uses the information in the message to insert an entry into the S1AP session table. The entry may be inserted using a key that corresponds to an MME UE ID or an MME UE IP address. The process 2000A then exits.

At S2006, the process 2000A uses the information in the message to update an entry into the S1AP session table. The process 2000A then exits.

Figure 20B:
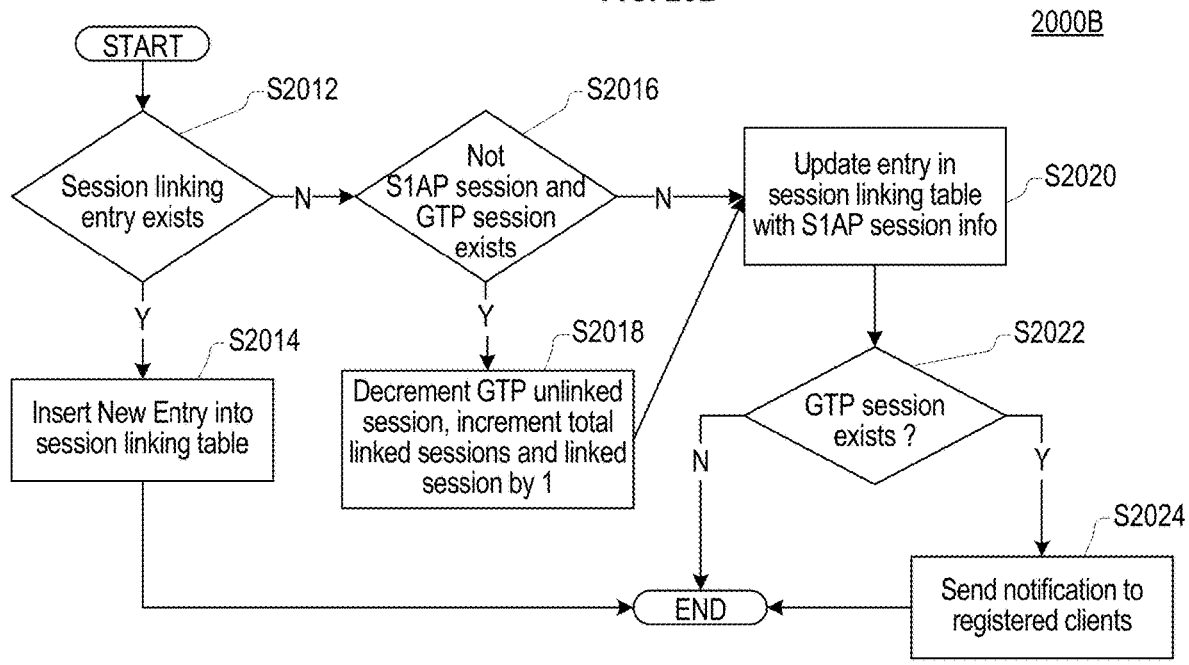

FIG. 20B illustrates another process 2000B for processing a message of type SESSION_MESSAGE_TYPE_S1AP_ADD or SESSION_MESSAGE_TYPE_S1AP_UPDATE, according to an embodiment. Both the process 2000B and the process 2000A of FIG. 20A may be used to process each message having the appropriate type.

At S2012, the process 2000B determines whether an entry corresponding to the message is in the session linking table. The key used to access the session linking table may correspond to an S1U SGW identifier. In response to the entry corresponding to the message existing in the session linking table, the process 2000B proceeds to S2014; otherwise, at S2012 the process 2000B proceeds to S2016.

At S2014, the process 2000B using the information in the message to create a new entry in the session linking table. The process 2000B may overwrite an existing entry if one exists. The process 2000B then exits.

At S2016, the process 2000B determines whether there is not an entry in the session linking table corresponding to the S1AP session and the corresponding GTP session exists. In response to this being true, the process 2000B proceeds to S2018; otherwise, at S2016 the process 2000B proceeds to S2020.

At S2018, the process 2000B decrements a counter corresponding to a number of unlinked GTP sessions, increments a counter corresponding to a total number of linked sessions, and increments a linked session counter by 1. The process 2000B then proceeds to S2020.

At S2020, the process 2000B updates an entry in the session linking table with the S1AP session information to link the S1AP session to the corresponding GTP session.

At S2022, the process 2000B determines whether the corresponding GTP session exists. In response to the corresponding GTP session existing, the process 2000B proceeds to S2024; otherwise, at S2016 the process 2000B exits.

At S2024, the process 2000B sends a notification to clients registered to receive information corresponding to the S1AP session. The process 2000B then exits.

Figure 21A:
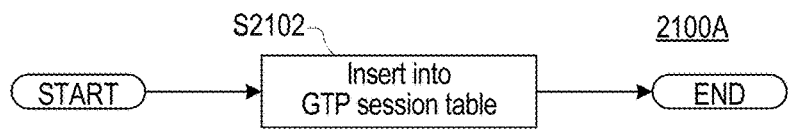
FIGS. 21A and 21B each illustrate a respective process for handling a message of type SESSION_MESSAGE_TYPE_GTP_V2_ADD, according to an embodiment.

FIG. 21A illustrates a process 2100A for processing a message of type SESSION_MESSAGE_TYPE_GTP_V2_ADD, according to an embodiment. The message may have been enqueued by one of the processes in FIGS. 7-19.

At S2102, the process 2100A uses the information in the message to insert an entry into the S1AP session table. The entry may be inserted using a key that corresponds to an S11 MME identifier or an MME IP address. The process 2100A then exits.

Figure 21B:
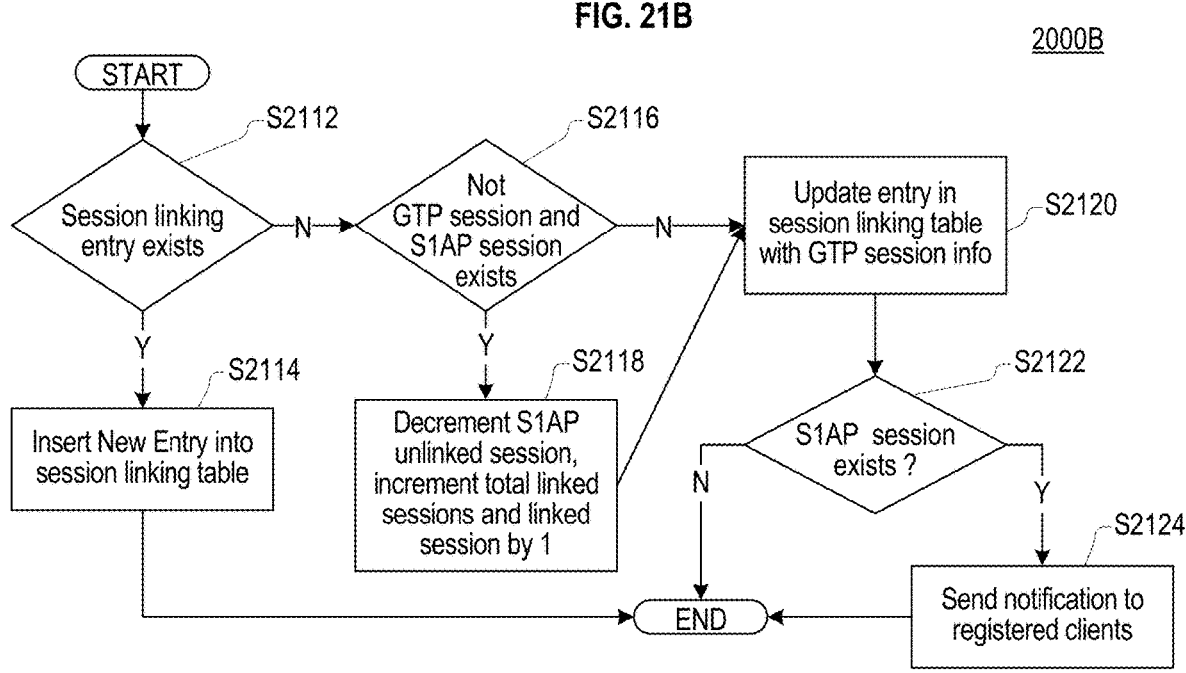

FIG. 21B illustrates another process 2100B for processing a message of type SESSION_MESSAGE_TYPE_GTP_V2_ADD, according to an embodiment. Both the process 2100B and the process 2100A of FIG. 21A may be used to process each message having the appropriate type.

At S2112, the process 2100B determines whether an entry corresponding to the message is in the session linking table. The key used to access the session linking table may correspond to an S1U SGW identifier. In response to the entry corresponding to the message existing in the session linking table, the process 2100B proceeds to S2114; otherwise, at S2112 the process 2100B proceeds to S2116.

At S2114, the process 2100B using the information in the message to create a new entry in the session linking table. The process 2100B may overwrite an existing entry if one exists. The process 2100B then exits.

At S2116, the process 2100B determines whether there is not an entry in the session linking table corresponding to the GTP session and the corresponding S1AP session exists. In response to this being true, the process 2100B proceeds to S2118; otherwise, at S2116 the process 2100B proceeds to S2120.

At S2118, the process 2100B decrements a counter corresponding to a number of unlinked S1AP sessions, increments a counter of a total number of linked sessions, and increments a linked session counter by 1. The process 2100B then proceeds to S2120.

At S2120, the process 2100B updates an entry in the session linking table with the GTP session information to link a corresponding S1AP session to the GTP session.

At S2122, the process 2100B determines whether the corresponding S1AP session exists. In response to the corresponding S1AP session existing, the process 2100B proceeds to S2124; otherwise, at S2116 the process 2100B exits.

At S2124, the process 2100B sends a notification to clients registered to receive information corresponding to the GTP session. The process 2100B then exits.

Figure 22A:
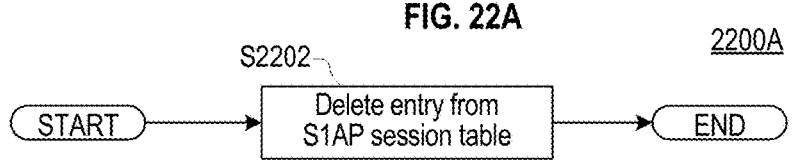
FIGS. 22A and 22B each illustrate a respective process for handling a message of type SESSION_MESSAGE_TYPE_SAP_REMOVE, according to an embodiment.

FIG. 22A illustrates a process 2200A for processing a message of type SESSION_MESSAGE_TYPE_S1AP_REMOVE, according to an embodiment. The message may have been enqueued by one of the processes in FIGS. 7-19.

At S2202, the process 2200A uses the information in the message to delete the entry corresponding to the message from an S1AP session table. The entry may be deleted using a key corresponding to an MME UE identifier or MME UE IP address. The process 2200A then exits.

Figure 22B:
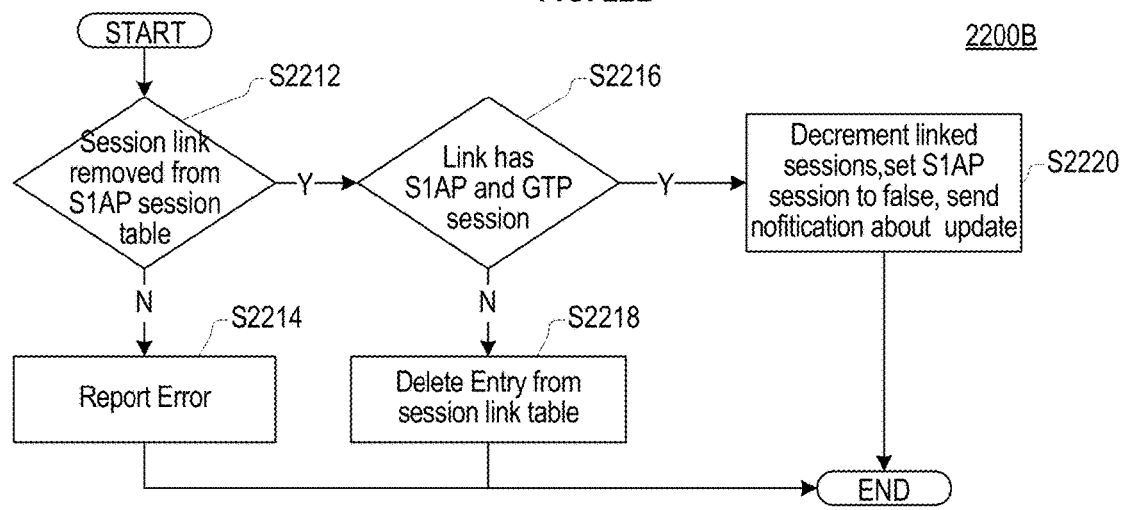

FIG. 22B illustrates another process 2200B for processing a message of type SESSION_MESSAGE_TYPE_S1AP_REMOVE, according to an embodiment. Both the process 2200B and the process 2200A of FIG. 22A may be used to process each message having the type SESSION_MESSAGE_TYPE_S1AP_REMOVE.

At S2212, the process 2200B determines whether an entry corresponding to the message has been removed from the S1AP session table. The key used to access the S1AP linking table may correspond to an S1U SGW identifier. In response to the entry corresponding to the message not having been removed from the S1AP session table, the process 2200B proceeds to S2214; otherwise, at S2212 the process 2200B proceeds to S2216.

At S2214, the process 2200B reports an error. The process 2200B then exits.

At S2216, the process 2200B determines whether a link corresponding to the message has an S1AP session and a GTP session. In response to this being true, the process 2200B proceeds to S2220; otherwise, at S2216 the process 2200B proceeds to S2218.

At S2218, the process 2200B deletes the entry corresponding to the message from the session linking table. The process 2200B then exits.

At S2220, the process 2200B decrements a counter corresponding to a number of linked sessions, sets an S1AP session status to false, and sends a notification to clients registered to receive information corresponding to the update. The process 2200B then exits.

Figure 23A:
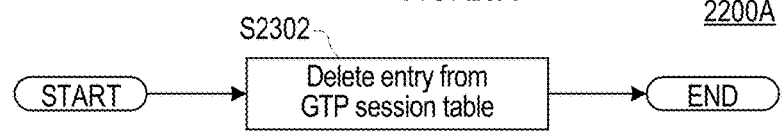
FIGS. 23A and 23B each illustrate a respective process for handling a message of type SESSION_MESSAGE_TYPE_GTP_V2_REMOVE, according to an embodiment.

FIG. 23A illustrates a process 2300A for processing a message of type SESSION_MESSAGE_TYPE_GTP_V2_REMOVE, according to an embodiment. The message may have been enqueued by one of the processes in FIGS. 7-19.

At S2302, the process 2300A uses the information in the message to delete the entry corresponding to the message from the GTP session table. The entry may be deleted using a key that corresponds to an S11 MME identifier or an MME IP address. The process 2300A then exits.

Figure 23B:
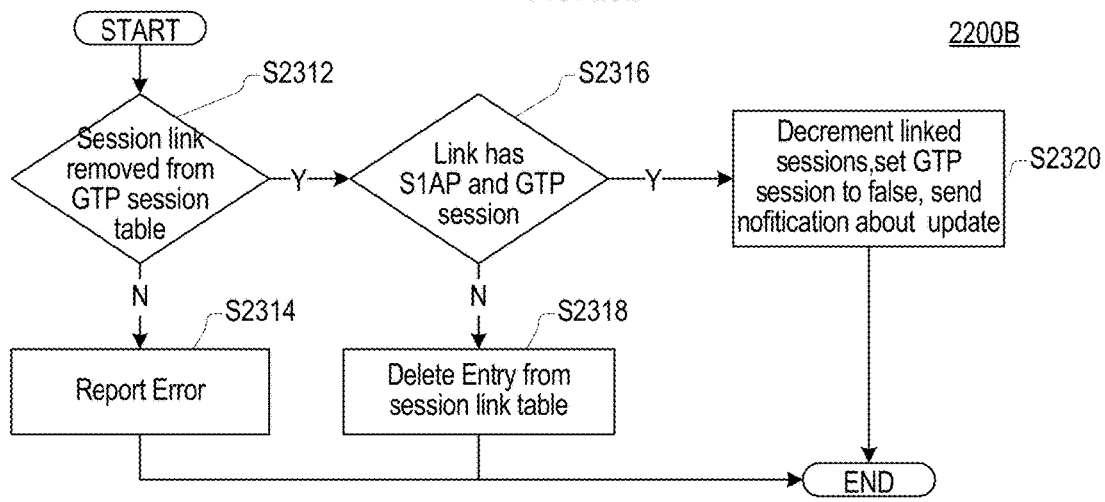

FIG. 23B illustrates another process 2300B for processing a message of type SESSION_MESSAGE_TYPE_GTP_V2_REMOVE, according to an embodiment. Both the process 2300B and the process 2300A of FIG. 23A may be used to process each message having the type SESSION_MESSAGE_TYPE_GTP_V2_REMOVE.

At S2312, the process 2300B determines whether an entry corresponding to the message has been removed from the GTP linking table. The key used to access the GTP linking table may correspond to an S1U SGW identifier. In response to the entry corresponding to the message not having been removed from the GTP session table, the process 2300B proceeds to S2314; otherwise, at S2312 the process 2300B proceeds to S2316.

At S2314, the process 2300B reports an error. The process 2300B then exits.

At S2316, the process 2300B determines whether a link corresponding to the message has an S1AP session and a GTP session. In response to this being true, the process 2300B proceeds to S2320; otherwise, at S2316 the process 2300B proceeds to S2318.

At S2318, the process 2300B deletes the entry corresponding to the message from the session linking table. The process 2300B then exits.

At S2320, the process 2300B decrements a counter corresponding to a number of linked sessions, sets a GTP session status to false, and sends a notification to clients registered to receive information corresponding to the update. The process 2300B then exits.

Figure 24:
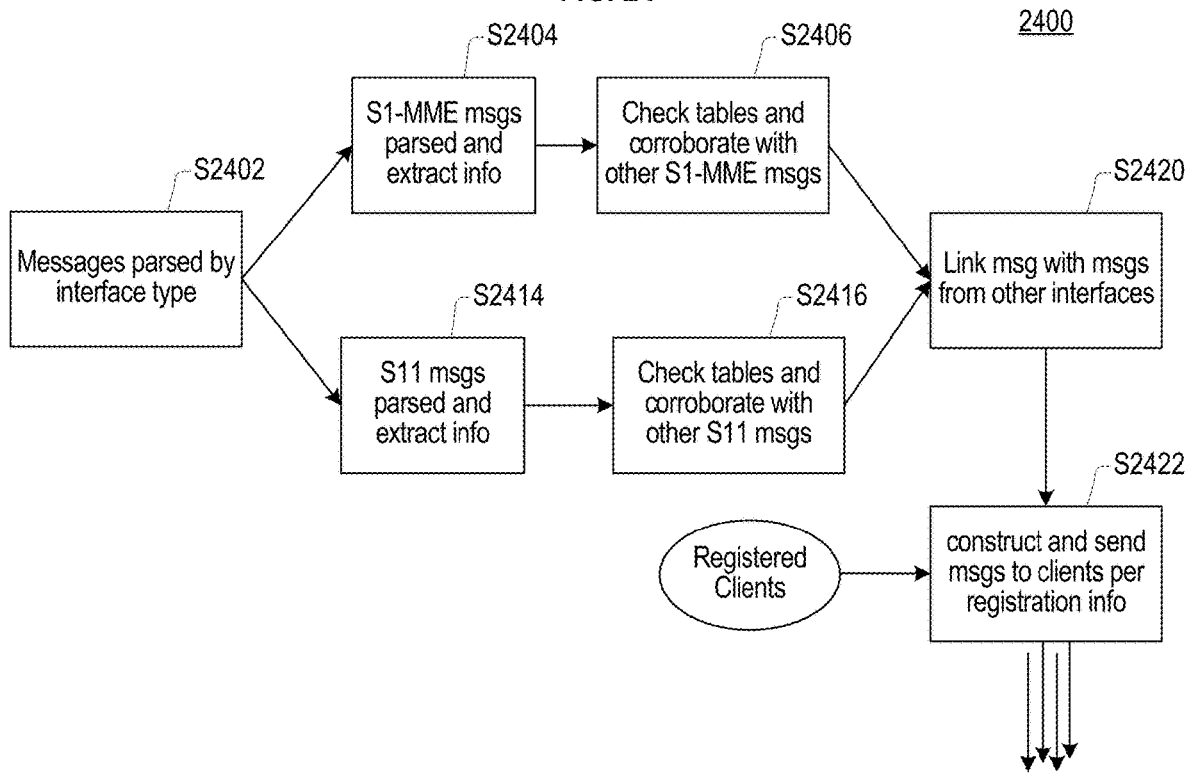
FIG. 24 illustrates a process for parsing messages, according to an embodiment.

FIG. 24 illustrates a process 2400 for parsing messages received through an S1-MME or an S11 interface, according to an embodiment.

At S2402, the process 2400 determines the interface over which the message we received. In response to the message being received through an S1-MME interface, the process 2400 proceeds to S2404. In response to the message being received through an S11 interface, the process 2400 proceeds to S2414.

At S2404, the process 2400 parses the message using a parser configured for S1-MME messages. The process 4200 then extracts information from the parsed message.

At S2406, the process 2400 checks the MPC tables, such as one or more of a S1AP session table, a GTP session table, a session linking table, a location tracking table, or an initiating message table, for information related to one or more identifiers in the message, and corroborates the message with other S1-MME messages, which may include linking the message to other S1-MME messages.

At S2414, the process 2400 parses the message using a parser configured for S11 messages. The process 4200 then extracts information from the parsed message.

At S2416, the process 2400 checks the MPC tables, such as one or more of a S1AP session table, a GTP session table, a session linking table, a location tracking table, or an initiating message table, for information related to one or more identifiers in the message, and corroborates the message with other S11 messages, which may include linking the message to other S11 messages.

At S2420, the process 2400 links messages received through one interface with messages received from another interface. For example, at S2420, the process 2400 may link an S11 message to an S1-MME message.

At S2422, the process 2400 determines, using the registration information for clients, which messages should be sent to clients in response to the parsed message, and then constructs and sends those messages to the appropriate clients. The process 2400 then exits.

FIG. 25 illustrates an illustrative timeline of events that may generate messages that may be received by an MPC according to an embodiment. The events are shown on a timeline covering 8 AM to 8 PM of on day.

While several embodiments of the present disclosure have been illustrated and described herein, many changes can be made without departing from the spirit and scope of the invention. For example, it can be appreciated that the disclosure may be used in wireless networks, wired networks, fiber networks and coaxial networks alone, or in combination. Accordingly, the scope of the invention is not limited by any disclosed embodiment.

What is claimed is:

1. A non-transitory computer readable medium (CRM) storing computer programming instructions which, when executed by a computer system, cause the computer system to perform a method comprising:
   receiving a first registration request from a first application, the first registration request configured to select a first type of information from among the plurality of types of information and subscribe the first application to the first type of information;
   registering the first application as subscribing to the first type of information to produce registration information of the first application;

receiving data from a plurality of input interfaces, each interface being defined differently from each other interface;

parsing the data;

filtering, using the registration information of the first application, the parsed data to produce filtered data including data of the first type of information;

storing the filtered data in a metric storage;

mapping the filtered data according to the input interfaces; and providing, based on the first application being registered as subscribing to the first type of information, the filtered data stored in the metric storage to the first application.

2. The non-transitory CRM of claim 1, wherein the plurality of input interfaces include two or more different interfaces selected from a group comprising $3^{rd}$ Generation Partnership Project (3GPP) interfaces, Long Term Evolution (LTE) interfaces, and custom interfaces.

3. The non-transitory CRM of claim 1, wherein the first application is a traffic manager.

4. The non-transitory CRM of claim 1, wherein the steps further comprise:

receiving a second registration request from a second application, the second registration request configured to select a second type of information from among the plurality of types of information; and registering the second application, wherein registering the second application includes registering the second application as publishing the second type of information, registering the second application as subscribing to the second type of information, or both.

5. The non-transitory CRM of claim 4, wherein the steps further comprise:

providing a parser interface, wherein registering the second application is performed using the parser interface.

6. The non-transitory CRM of claim 4, wherein receiving the data from the plurality of input interfaces includes receiving data of the second type of information from the second application only if the second application is registered to publish the second type of information.

7. The non-transitory CRM of claim 4, wherein storing the filtered data in the metric storage is performed only if an application is registered as subscribing to a type of information included in the filtered data.

8. The non-transitory CRM of claim 1, wherein providing the filtered data to the first application includes providing the filtered data to the first application in response to receiving the data of the first type of information.

9. The non-transitory CRM of claim 1, wherein filtering the data includes:

corroborating the parsed data received over a first interface of the plurality of input interfaces with first other parsed data received over the first interface;

linking the corroborated parsed data with second other parsed data received over the first interface; and linking the parsed data with third other parsed data received over a second interface of the plurality of input interfaces different than the first interface.

10. The non-transitory CRM of claim 1, wherein parsing the data includes parsing the data according to the input interface the data was received through.

* * * * *